(12) United States Patent
Tanuma et al.

(10) Patent No.: US 10,731,238 B2
(45) Date of Patent: Aug. 4, 2020

(54) CAST STEEL PROJECTION MATERIAL

(71) Applicant: SINTOKOGIO, LTD., Nagoya-shi, Aichi (JP)

(72) Inventors: Naoya Tanuma, Toyokawa (JP); Hayato Taniguchi, Toyokawa (JP)

(73) Assignee: SINTOKOGIO, LTD., Nagoya-shi, Aichi (JP)

( * ) Notice: Subject to any disclaimer, the term of this patent is extended or adjusted under 35 U.S.C. 154(b) by 0 days.

(21) Appl. No.: 16/071,633

(22) PCT Filed: Oct. 17, 2016

(86) PCT No.: PCT/JP2016/080720
§ 371 (c)(1),
(2) Date: Jul. 20, 2018

(87) PCT Pub. No.: WO2017/130476
PCT Pub. Date: Aug. 3, 2017

(65) Prior Publication Data
US 2019/0032176 A1    Jan. 31, 2019

(30) Foreign Application Priority Data

Jan. 26, 2016 (JP) .................................. 2016-012295

(51) Int. Cl.
*C22C 38/18* (2006.01)
*B24C 1/10* (2006.01)
(Continued)

(52) U.S. Cl.
CPC ................ *C22C 38/18* (2013.01); *B24C 1/08* (2013.01); *B24C 1/086* (2013.01); *B24C 1/10* (2013.01);
(Continued)

(58) Field of Classification Search
None
See application file for complete search history.

(56) References Cited

U.S. PATENT DOCUMENTS

| 2007/0068605 A1* | 3/2007 | Statnikov | ............... C21D 10/00 |
| | | | 148/558 |
| 2009/0314049 A1* | 12/2009 | Ueda | .................... C21D 8/0205 |
| | | | 72/364 |

(Continued)

FOREIGN PATENT DOCUMENTS

| CN | 101152706 A | 4/2008 |
| CN | 102534397 A | 7/2012 |

(Continued)

OTHER PUBLICATIONS

English Translation of Ochiaki et al. (JP 03-2712329) (Year: 1991).*

(Continued)

*Primary Examiner* — Ronak C Patel
(74) *Attorney, Agent, or Firm* — Faegre Drinker Biddle & Reath LLP (57) ABSTRACT

A cast steel shot media for performing a blasting treatment, including, at a weight ratio, 0.8% or more and 1.2% or less of C, 0.35% or more and 1.2% or less of Mn, and 0.4% or more and 1.5% or less of Si, in which a remainder has a hyper-eutectoid composition including Fe and inevitable impurities, and the cast steel shot media has a structure having a fine pearlite structure as a main constituent.

11 Claims, 5 Drawing Sheets

(51) Int. Cl.

| | |
|---|---|
| *C22C 38/04* | (2006.01) |
| *C22C 38/02* | (2006.01) |
| *C22C 38/00* | (2006.01) |
| *C21D 9/00* | (2006.01) |
| *C21D 6/00* | (2006.01) |
| *C09K 3/14* | (2006.01) |
| *B24C 11/00* | (2006.01) |
| *B24C 1/08* | (2006.01) |

(52) U.S. Cl.
CPC ............... *B24C 11/00* (2013.01); *C09K 3/14* (2013.01); *C09K 3/1436* (2013.01); *C21D 6/002* (2013.01); *C21D 9/0068* (2013.01); *C22C 38/002* (2013.01); *C22C 38/02* (2013.01); *C22C 38/04* (2013.01); *C21D 2211/003* (2013.01); *C21D 2211/008* (2013.01); *C21D 2211/009* (2013.01)

(56) References Cited

U.S. PATENT DOCUMENTS

| | | |
|---|---|---|
| 2013/0065079 A1 | 3/2013 | Ueda et al. |
| 2015/0017475 A1* | 1/2015 | Ward-Close ......... B22F 3/1035 428/660 |

FOREIGN PATENT DOCUMENTS

| | | |
|---|---|---|
| CN | 103334059 A | 10/2013 |
| GB | 7563640 A | 9/1956 |
| JP | S53-32493 A | 3/1978 |
| JP | H03-271329 A | 12/1991 |
| JP | H04-310371 A | 11/1992 |
| JP | H06-297132 A | 10/1994 |
| JP | 2005-205513 A | 8/2005 |
| JP | 2008050687 A | 3/2008 |
| JP | 2010-167529 A | 8/2010 |
| JP | 5777201 B2 | 9/2015 |
| KR | 20120050790 A | 5/2012 |

OTHER PUBLICATIONS

English Translation of Morita et al. (JP 08-188881) (Year: 1996).*
English abstract of Ochiaki et al. (JP 03-2712329) (Year: 1991).*
International Preliminary Report on Patentability dated Aug. 9, 2018 for PCT/JP2016/080720.
The Extended European Seach Report dated May 6, 2019 in European Patent Application No. 16888061.5.

* cited by examiner

CAST STEEL PROJECTION MATERIAL

TECHNICAL FIELD

The present invention relates to a cast steel shot media used for a blasting treatment.

BACKGROUND ART

In related art, in order to perfoun grinding for removing scales such as foundry sand adhering to a surface or rust formed on a surface of a base material after casting with respect to a casting, a blasting treatment has been performed to project hard particles onto the casting. The grinding of casting is often performed, using a shot media having iron as a main constituent (for example, Patent Literature 1).

In the operation of the blast device, the cycle of "projection→recovery→selection→projection" of the shot media is repeated. In this way, the shot media is repeatedly projected toward the workpiece. When the shot media collides with the workpiece, crushing or abrasion occurs in the shot media, and the shot media finally has the size incapable of being reused. For this reason, the shot media is required to have both of performances such as a prevention of crushing or abrasion in the shot media at the time of blasting treatment (long life expectancy), and a high grinding capability (high hardness).

CITATION LIST

Patent Literature

Patent Literature 1: Japanese Unexamined Patent Publication No. H6-297132

SUMMARY OF INVENTION

Technical Problem

For the blasting treatment, a cast steel shot media of high carbon is often used. Tempered martensite is a main constituent of the metal structure of the cast steel shot media of high carbon. If the hardness of the shot media is enhanced or the particle diameter of the shot media is increased in order to increase the grinding capability of blasting treatment with such a shot media, toughness of the shot media decreases. As a result, there has been a problem in which damage such as crushing or abrasion became severe and the life expectancy of the shot media was shortened.

Therefore, it is demanded to provide a cast steel shot media which can achieve both long life expectancy and improved grinding power.

Solution to Problem

In an aspect, a cast steel shot media for performing a blasting treatment is provided. The cast steel shot media contains, at a weight ratio, 0.8% or more and 1.2% or less of C, 0.35% or more and 1.2% or less of Mn, and 0.4% or more and 1.5% or less of Si, a remainder has a hyper-eutectoid composition including Fe and inevitable impurities, and the cast steel shot media has a structure having a fine pearlite structure as a main constituent. In an embodiment, the cast steel shot media may further contain P of 0.05% or less and 0.05% or less of S as inevitable impurities at a weight ratio.

The cast steel shot media according to an aspect has the above-mentioned hyper-eutectoid composition and includes a structure having an actually fine pearlite structure as a main constituent. Since the progress of cracks can be suppressed by the fine layered structure by miniaturizing the pearlite structure serving as a main constituent, the cast steel shot media of an embodiment has high toughness. Accordingly, since crushing or abrasion is hard to occur in the cast steel shot media when a blasting treatment is performed, and as a result, the life expectancy of the cast steel shot media can be prolonged. Further, since the hardness of the cast steel shot media can be enhanced by miniaturizing the pearlite structure, high grinding power can be obtained. Thus, according to the cast steel shot media of an aspect, it is possible to achieve both a longer life expectancy and an improved grinding power.

The cast steel shot media according to an embodiment may have a mixed structure of a fine pearlite structure and pro-eutectoid cementite.

The cast steel shot media according to the above embodiment can further enhance the hardness by including the pro-eutectoid cementite. Thus, the grinding power can be further enhanced.

The cast steel shot media according to an embodiment may have a Rockwell hardness of HRC 35 or more and HRC 50 or less.

The cast steel shot media according to an embodiment may be formed in a substantially spherical shape having an average particle diameter of 0.3 mm or more and 3.5 mm or less.

The cast steel shot media according to an embodiment may be used for grinding of the casting.

In the cast steel shot media according to an embodiment, a passive film may be formed on the surface.

In the cast steel shot media according to an embodiment, a weight ratio of C may be 0.8% or more and 1.1% or less.

In the cast steel shot media according to an embodiment, a weight ratio of Mn may be 0.6% or more and 1.1% or less.

In the cast steel shot media according to an embodiment, a weight ratio of Si may be 0.6% or more and 1.0% or less.

The cast steel shot media according to an embodiment may further contain Cr of 0.05% or more and 0.8% or less at a weight ratio.

Advantageous Effects of Invention

According to the aspect and various embodiments of the present invention, it is possible to obtain both an increase in life expectancy of the cast steel shot media and an improvement in the abrasion resistance.

DESCRIPTION OF EMBODIMENTS

Hereinafter, various embodiments will be described in detail with reference to the drawings. A cast steel shot media (hereinafter referred to as "shot media SM") of one embodiment is hyper-eutectoid steel having the following chemical composition at a weight ratio.

C (carbon): 0.8% or more and 1.2% or less
Mn (manganese): 0.35% or more and 1.2% or less
Si (silicon): 0.4% or more and 1.5% or less
Remainder: Fe (iron) and inevitable impurities.

Here, inevitable impurities are components other than C, Mn, Si, and Fe, and are components mixed into the shot media SM without being intentionally added. Examples of inevitable impurities include P (phosphorous) and S (sulfur). In an embodiment, the shot media SM may contain P (phosphorus) of 0.05% or less and S (sulfur) of 0.05% or less at a weight ratio to the shot media SM as inevitable impurities.

The shot media SM can be manufactured, for example, by the following process.

(1) A process of weighing and melting a metal material as a raw material to obtain a target composition ratio, and then making a molten metal (cast steel)

(2) A process of granulating the molten metal to form spherical particles.

For example, spherical particles are produced, using an atomizing method for producing spherical particles by pulverizing the molten metal with water jet, high-pressure gas, centrifugal force and the like. The spherical particles can be produced inexpensively, using the atomizing method for granulation.

(3) A process of transforming the structure of the spherical particles into a pearlite structure Since the shot media SM is a hyper-eutectoid composition, by subjecting the shot media SM to heat treatment under appropriate conditions, it is possible to produce a shot media SM having a structure substantially having a fine pearlite structure as a main constituent, or a mixed structure with pro-eutectoid cementite substantially having a fine pearlite structure as a main constituent.

The heat treatment is appropriately set to obtain a desired structure on the basis of a continuous cooling transformation diagram or the like. For example, the spherical particles are cooled from the austenizing temperature of 800° C. or more to the transformation initiation temperature at an average cooling rate of 5 to 35° C./s, and thereafter, the spherical particles are isothermally kept or gradually cooled until the generation of the fine pearlite structure is completed. Thus, it is possible to obtain the shot media SM having a fine pearlite structure.

Here, the fine pearlite structure is a fine pearlite structure formed when cooled in the vicinity of the pearlite nose in an isothermal transformation diagram, and for example, the fine pearlite structure is a structure that can be visually recognized by enlarging to 2000 times after etching the polished surface. As an interlayer interval in the pearlite structure is small, the hardness increases. Thus, the grinding power of the shot media having a fine pearlite structure is improved. Here, the fine pearlite structure in the present application refers to a fine pearlite structure having a structure with an interlayer interval of 1.0 μm or less as a main constituent. That is, the shot media SM may partially include a pearlite structure having the interlayer interval exceeding 1.0 μm.

When bainite is present in the structure of the shot media, the toughness decreases. In the shot media SM of one embodiment, since the structure serving as the main constituent is a fine pearlite structure, it is possible to have high toughness. As a result, since the shot media SM is hard to be worn out, it is possible to prolong the life expectancy of the shot media SM when the blasting treatment is performed.

The composition of the shot media SM will be described. In the following description, the content means a weight ratio (mass %) unless otherwise specified.

(1) C: 0.8% or more and 1.2% or less

C is set to a composition that causes hyper-eutectoid. In order to achieve hyper-eutectoid, the content of C in the shot media SM can be set to 0.8% or more. If the content of C is too large, the amount of pro-eutectoid cementite excessively increases and the toughness of the shot media SM decreases. Thus, the content of C can be set to 1.2% or less. In one embodiment, the content of C in the shot media SM may be set to 1.1% or less.

(2) Mn: 0.35% or more and 1.2% or less

Mn is important for deoxidation of the molten metal and improvement of fluidity. When Mn is small, deoxidation of the molten metal becomes insufficient and fluidity of the molten metal decreases. Thus, non-spherical particles such as spindle shape and rod shape increases, and the shape of the shot media deteriorates. Therefore, the content of Mn in the shot media SM can be set to 0.1% or more, and in particular from the viewpoint of yield of spheroidized particles (yield ratio), the content of Mn can be set to 0.35% or more. Further, if the content of Mn in the shot media SM is too large, since the bainite structure is mixed in the fine pearlite structure and the toughness of the shot media SM decreases, the content of Mn in the shot media SM can be set to 1.2% or less. In one embodiment, the content of Mn in the shot media SM may be set to 0.6% or more and 1.1% or less.

(3) Si: 0.4% or more and 1.5% or less

Si is important for deoxidation of molten metal and improvement of the fluidity, similarly to Mn. If the amount of Si in the shot media SM is small, deoxidation of the molten metal becomes insufficient and the fluidity of the molten metal is lowered. Thus, the shape of the shot media SM deteriorates. Accordingly, the content of Si can be set to 0.1% or more, and in particular from the viewpoint of the yield of spheroidized particles (yield ratio), the content of Si can be set to 0.4% or more. Furthermore, if Si is excessively added, since the toughness of the shot media is lowered, the content of Si in the shot media SM may be set to 1.5% or less. In one embodiment, the content of Si may be set to 0.6% or more and 1.0% or less.

(4) P: 0.05% or less, S: 0.05% or less

If the contents of P and S in the shot media SM are excessive, since the toughness of the shot media SM is lowered, the contents of P and S in the shot media SM can be set to 0.05% or less. Further, P and S may not necessarily be contained in the shot media SM. In a case where P and S are contained, P and S may be contained in the shot media SM, for example, at a rate of at least 0.005% or more.

In one embodiment, in addition to the above-mentioned elements, Cr can also be contained in the shot media SM at a weight ratio of 0.05% or more and 2.00% or less. By containing Cr in the shot media SM, the pearlite structure is miniaturized and the network formation of cementite can be suppressed. Thus, it is possible to enhance the toughness of the shot media SM. Here, if Cr is excessively contained in the shot media SM, carbide of Cr increases and the toughness sharply decreases. Thus, the content of Cr in the shot media SM can be set to 2.00% or less. Since the addition of Cr leads to an increase in the production cost, the addition amount of Cr can be suppressed within a range that does not cause any problems in practical use. For example, from the viewpoint of manufacturing cost, the content of Cr in the shot media SM can be set to 0.05% or more and 0.8% or less.

In addition, since Si and Mn have an effect of delaying the pearlite transformation initiation point (shifting to the long-time side), a fine pearlite structure can be obtained even at a slow cooling rate.

Further, in order to use for a grinding application which removes scales such as casting sand adhering to the surface after casting or rust formed on the surface of the base material with respect to the casting, the hardness of Rockwell hardness HRC 35 (Vickers Hardness By 345) or more is required. Since the shot media SM miniaturizes the pearlite structure as a main body, the hardness can be set to Rockwell hardness HRC 35 (Hv 345) or more. In addition, when there is a hyper-eutectoid composition and pro-eutectoid cementite is precipitated in the cooling process, the hardness of the shot media SM can be further enhanced, and the Rockwell hardness HRC 35 or more and HRC 50 or less (Hv 345 or more and Hv 513 or less) can be set. In this way, since the shot media SM has sufficient hardness, the shot media SM can be suitably used in the blasting treatment which requires a large impact force, such as grinding and deburring of the casting.

The particle diameter of the shot media SM is appropriately selected in accordance with the properties of the workpiece. In one embodiment, the shot media SM can be formed in a substantially spherical shape having an average particle diameter of 0.3 mm or more and 3.5 mm or less. Generally, as the particle diameter of the shot media is small, the chance of collision with the workpiece increases. Thus, the entire workpiece can be uniformly blasted. However, if the particle diameter of the shot media is small, the grinding power decreases. Therefore, if the particle size is too small (for example, less than 0.3 mm), it is not possible to obtain a polishing force capable of sufficiently blasting the workpiece. Even in the case of having a blasting power capable of performing the blasting treatment, since the original grinding power of the shot media having a relatively small particle diameter is relatively small, when using the shot media that is liable to be worn, it is liable to lose the grinding power enough to sufficiently perform the blasting treatment of the workpiece after being worn out.

Further, in general, as the particle size of the shot media is large, the grinding power is high, but the shot media is easily worn out. In the case of using a shot media which is liable to be worn out, the influence on the particle diameter distribution is large. Thus, in some cases, it may be difficult to control the grinding power. Since the shot media SM is hard to be worn out and the size of the shot media is hard to reduce (for example, 1.0 mm or more), the polishing efficiency can be improved.

Figure 1:
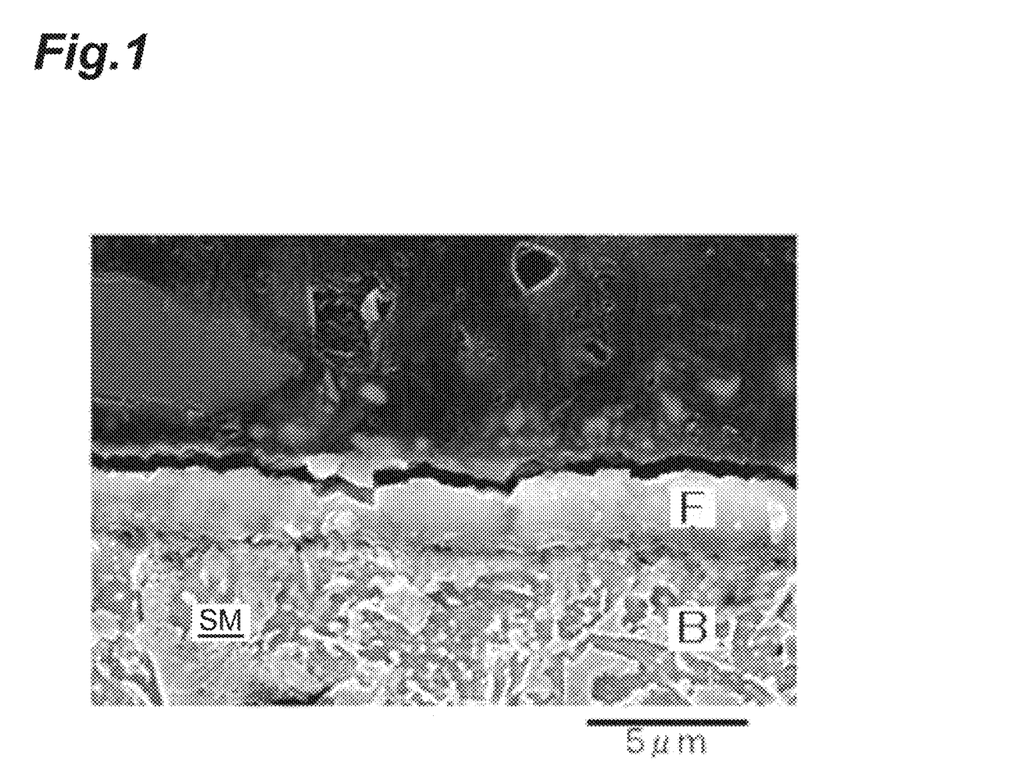
FIG. 1 is a scanning electron microscope photograph illustrating a cross-sectional structure of a shot media having a passive film formed thereon.

As illustrated in FIG. 1, the shot media SM of one embodiment may have a strong passive film F (for example, an oxide film such as a black skin) formed on the surface of the base material B of the shot media. In general, since the shot media is kept in the atmosphere, rust or the like may be formed on the surface. If the blasting treatment is performed with a shot media on which rust or the like is formed on the surface, the rust or the like adheres to the workpiece, and the quality of the workpiece may deteriorate. The cast steel containing the pearlite structure tends to corrode on the surface, but in the shot media SM of one embodiment, since the passive film F is formed on the surface of the base material B, corrosion resistance can be improved. Therefore, in the blasting treatment using the shot media SM according to one embodiment, it is possible to prevent deterioration in the quality of the workpiece due to adhesion of rust or the like.

Here, if the film thickness of the passive film F is too thin, the surface of the shot media S is exposed and sufficient corrosion resistance cannot be obtained. In contrast, if the passive film F is too thick, the adhesion of the passive film F to the surface of the shot media S is reduced, and the passive film F may be peeled off. Therefore, in a case where a black skin is formed as the passive film F, the average film thickness of the shot media SM can be set to 2 µm or more and 5 µm or less.

MODIFIED EXAMPLE

The shape of the shot media SM is not limited to a substantially spherical shape (shot), but a polygonal shape (grit) having a sharp edge or the like can also be used.

Effects of Embodiment

According to the cast steel shot media SM of an embodiment, by miniaturizing the pearlite structure as the main constituent, since the progress of cracks can be suppressed by the fine layered structure, high toughness can be obtained. As a result, since crushing or abrasion is hard to occur in the shot media SM when the blasting treatment is performed, the life expectancy of the shot media SM can be prolonged. Further, the hardness can be enhanced by miniaturizing the pearlite structure, and in particular, by including pro-eutectoid cementite, the hardness can be further enhanced. As a result, it is possible to obtain a shot media SM having high grinding power.

In this way, according to the cast steel shot media SM of an embodiment, it is possible to achieve both a prolonged life expectancy and an improvement in the grinding power.

Examples that have been performed to check the effect of the present invention will be described.

First Example

Relation Between Cooling Rate and Hardness

A relation between the cooling rate from the austenizing temperature to the pearlite transformation initiation temperature and the hardness of the shot media SM was examined. In the first example, the raw material was blended so as to be a desired component, and the raw material was melted at 1650 to 1680° C. Further, spherical particles were prepared from the melted raw materials by the water atomization method.

After drying, the obtained spherical particles were sieved to pass through a 2.00 mm sieve, and the spherical particles left on a 1.70 mm sieve are cooled from temperature ranges austenitized at 800° C. or higher to the pearlite transformation initiation temperature at various average cooling rates, and are kept isothermally until the completion of the structure transformation to prepare the shot media SM. Further, the hardness of the prepared shot media SM was evaluated.

The chemical composition of the prepared shot media SM was analyzed by an emission spectral analysis. The composition of the prepared shot media SM was C: 0.934%, Si: 0.906%, Mn: 1.040%, P: 0.027%, S: 0.026%, and Cr: 0.677%.

The hardness was measured in accordance with the method specified in JIS-Z0311: 2004, which is Japanese Industrial Standard. The shot media SM was embedded in the resin and polished, Vickers hardness was measured at a test load of 9.8 N and a loading time of 12 seconds, and the average value of the measured values of the effective 20 points was obtained.

Figure 2:
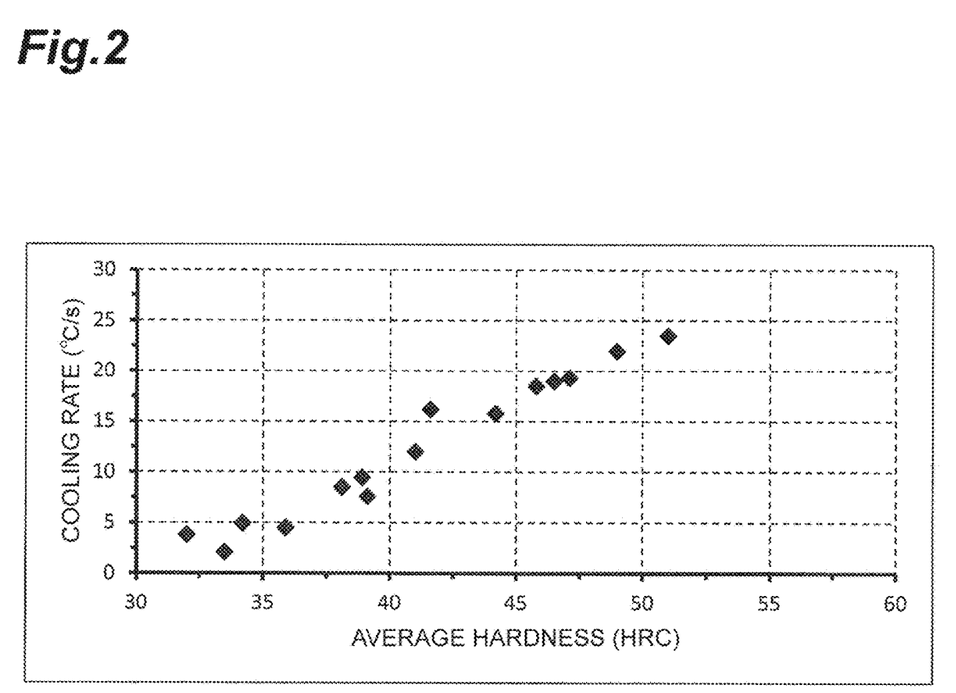
FIG. 2 is a graph illustrating a relation between a cooling rate from an austenizing temperature to a pearlite transformation initiation temperature and hardness of the shot media.

The relation between the cooling rate and hardness is illustrated in Table 1 and FIG. 2. The hardness was expressed in terms of the Rockwell hardness C scale (HRC).

TABLE 1

| Sample No. | Cooling rate (° C./s) | Average hardness (HRC) |
|---|---|---|
| 1 | 2.13 | 33.5 |
| 2 | 3.80 | 32.0 |
| 3 | 4.93 | 34.2 |
| 4 | 4.50 | 35.9 |
| 5 | 16.20 | 41.6 |
| 6 | 15.80 | 44.2 |
| 7 | 12.00 | 41.0 |
| 8 | 9.50 | 38.9 |
| 9 | 7.60 | 39.1 |
| 10 | 8.50 | 38.1 |
| 11 | 19.3 | 47.1 |
| 12 | 19.0 | 46.5 |
| 13 | 18.5 | 45.8 |
| 14 | 23.5 | 51.0 |
| 15 | 22.0 | 49.0 |

As illustrated in Table 1 and FIG. 2, it was checked that the hardness of the shot media SM increases as the cooling rate becomes faster. This is due to the miniaturization of the pearlite structure. Practically, the hardness of the shot media SM needs HRC 35 or more, but by setting the cooling rate to 5° C./s or higher, the hardness of the shot media can be set to HRC 35 or more.

Second Example

Relation Between Structure and Life Expectancy of Shot Media

In the second example, spherical particles were first granulated in the same manner as in the first example. Subsequently, the spherical particles were subjected to heat treatment under different conditions to form shot medias having the following structures A, B, C, D, E and F, respectively.

Structure A: fine pearlite structure
Structure B: tempered martensite structure
Structure C: mixed structure of fine pearlite structure and tempered martensite structure
Structure D: lower bainite structure
Structure E: mixed structure of lower bainite structure and upper bainite structure
Structure F: Mixed structure of upper bainite structure and fine pearlite structure The fine pearlite structure (including a structure including pro-eutectoid cementite) is a uniform fine pearlite structure obtained by rapidly cooling the pearlite structure to the pearlite transformation initiation temperature at various cooling rates and by isothermally keeping the pearlite structure sufficiently until the structure transformation is completed.

The tempered martensite structure was obtained by performing water quenching from the austenitizing temperature region and then adjusting various hardnesses by changing the tempering temperature.

The mixed structure of the fine pearlite structure and the tempered martensite structure was obtained by cooling to the pearlite transformation initiation temperature and performing the rapid cooling with cooling water before the isothermal holding pearlite transformation was completed.

The bainite structure and its mixed structure was obtained by austenitizing the structure, then, putting the structure into a salt bath at 300 to 400° C. and isothermally keeping the structure for 30 minutes.

In the second example, the hardness and the life expectancy of the shot media having the obtained structures A to F were evaluated. The evaluation method of the hardness is the same as in the first example. The life expectancy was evaluated by the life expectancy wear value (life expectancy ratio), and an impact crushing test based on Society of Automotive Engineers, Inc. (SAE) J-445 was performed, using Ervin type life tester (manufactured by Ervin).

The shot media passed through the sieve mesh of 2.00 mm, and 100 g of shot media left on the 1.70 mm sieve was prepared. Further, the shot media was charged into the Ervin type life tester, and projected onto the target of hardness HRC 65 (Hv 830) at projection speed 60 m/s to repeatedly collide with the target. Further, the crushed shot media was sieved and removed at every constant collision number of times, the weight of the remaining shot media was measured, and the test was conducted until the remaining shot media became 30% or less of the initial state. A numerical value obtained by integrating a life expectancy curve showing a relation between the number of collision times obtained by this test and the weight ratio of the remaining shot medias was taken as the life expectancy value. The life expectancy ratio illustrated in Table 2 is expressed as a ratio when the life expectancy value of tempered martensite which is a general structure (Table 2, structure B: HRC 45.5) is set as 100, and illustrates that the durability is better as the value of the life expectancy ratio is large.

Figure 3:
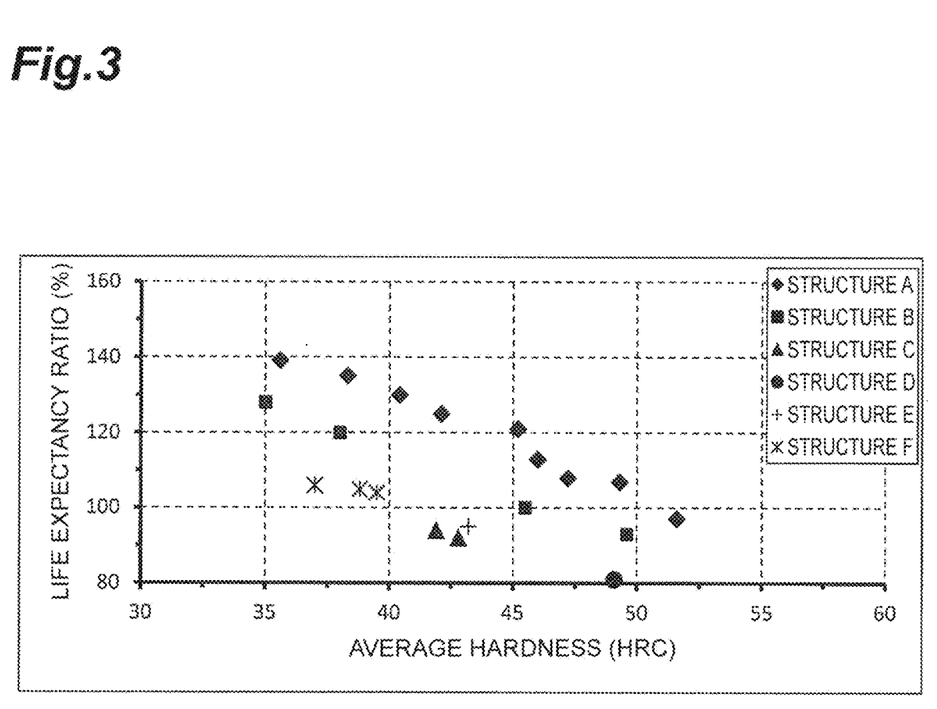
FIG. 3 is a graph illustrating a relation between the hardness and the life expectancy ratio of the shot media having various structures.

Table 2 and FIG. 3 illustrate the relation between the average hardness and the life expectancy ratio of the shot medias having the structures A to F.

TABLE 2

| Shot media structure | Average hardness (HRC) | Life expectancy (%) |
|---|---|---|
| Structure A | 35.6 | 139 |
| | 38.3 | 135 |
| | 40.4 | 130 |
| | 42.1 | 125 |
| | 45.2 | 121 |
| | 46.0 | 113 |
| | 47.2 | 108 |
| | 49.3 | 107 |
| | 51.6 | 97 |
| Structure B | 35.0 | 128 |
| | 38.0 | 120 |
| | 45.5 | 100 |
| | 49.6 | 93 |
| Structure C | 41.9 | 94 |
| | 42.8 | 92 |
| Structure D | 49.1 | 81 |
| Structure E | 43.2 | 95 |
| Structure F | 37.0 | 106 |
| | 38.8 | 105 |
| | 39.5 | 104 |

As illustrated in Table 2 and FIG. 3, the life expectancy ratio of each of the structure decreased as the hardness increased. This is because, as the hardness increases, the structure is easily crushed. In addition, it was checked that the shot media SM (structure A: fine pearlite structure) of one embodiment had a significantly longer life expectancy than the life expectancy of the shot media having a martensitic structure having a relatively long life expectancy.

Third Example

Relation Between Particle Diameter and Life Expectancy Ratio of Shot Media

Figure 4:
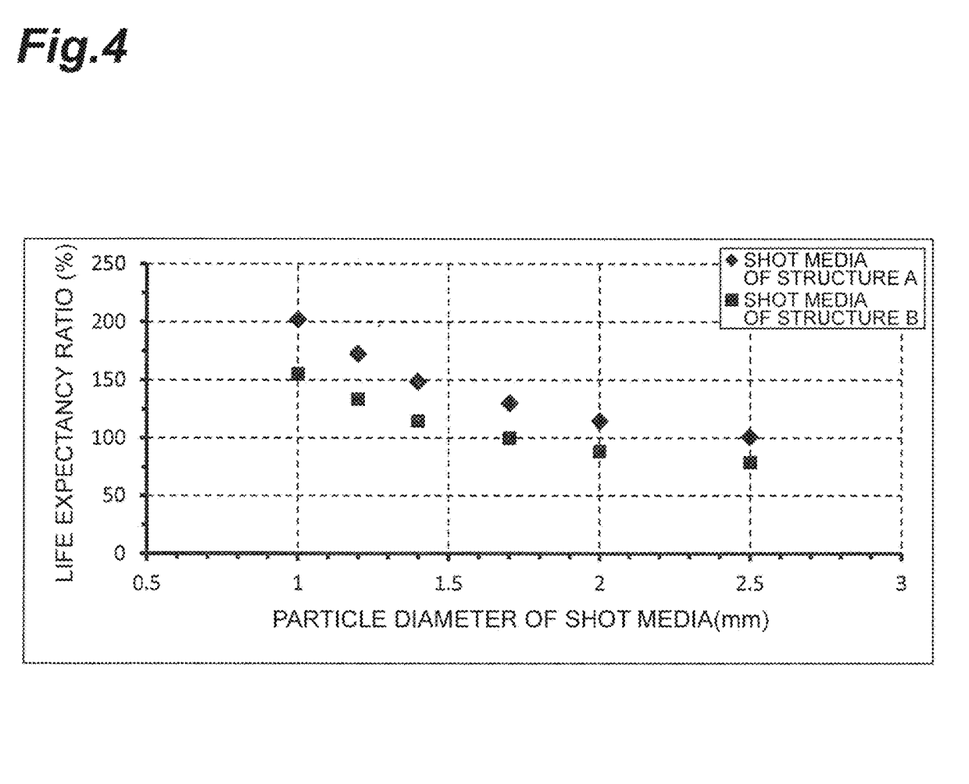
FIG. 4 is a graph illustrating a relation between the particle size and the life expectancy ratio of the shot media.

The relation between the particle size and the life expectancy ratio in the shot media of one embodiment, that is, the shot media SM having the structure A was compared with tempered martensite (structure B: HRC 45.5) which is a general composition. As illustrated in FIG. 4, it was checked that the life expectancy ratio decreases as the particle diameter of the shot media increases. Regardless of the particle size, it was checked that the shot media SM having the structure A had a longer life expectancy ratio than the shot media having the structure B. From these results, it was checked that the shot media SM having the structure A had a long life expectancy even when the particle diameter increased.

Fourth Example

Microstructure

Figure 5:
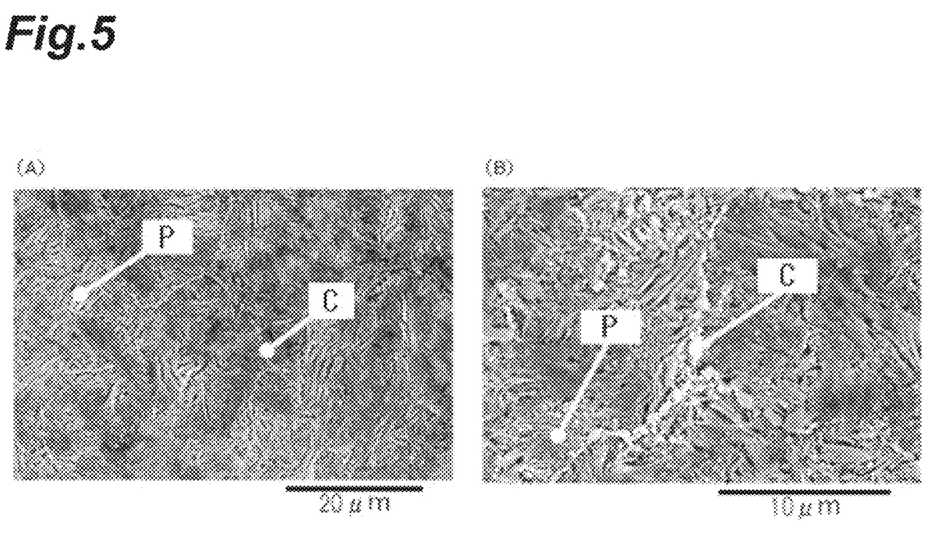
FIG. 5 is a scanning electron micrograph illustrating the microstructure of the shot media.

After polishing and etching the center portion of the shot media SM, the structure observation was performed with a scanning electron microscope. FIG. 5 illustrates the microstructure of the shot media SM. FIG. 5(A) is a photograph of the low magnification (2000 times) shot media SM. As illustrated in FIG. 5(A), it was checked that the layered fine pearlite structure (P in the drawing) was formed entirely in the shot media SM. Further, it was also checked that pro-eutectoid cementite (C in the drawing) was linearly formed in the shot media SM so as to partition the fine pearlite structure. FIG. 5(B) is a photograph of the shot media SM observed at a high magnification (5000 times). As illustrated in FIG. 5(B), pro-eutectoid cementite (C in the figure) was clearly checked as a white line in the shot media SM. Further, it was presumed that the interlayer distance of the extremely fine layered pearlite structure was about 0.05 μm or more and 0.5 μm or less, and it was checked that the shot media SM of one embodiment had a fine pearlite structure as a main constituent.

REFERENCE SIGNS LIST

B . . . Base material of shot media
C . . . Pro-eutectoid cementite
F . . . Passive film
P . . . Pearlite structure
SM . . . Shot media

The invention claimed is:

1. A cast steel shot media for performing a blasting treatment, comprising, at a weight ratio
   0.8% or more and 1.2% or less of C,
   0.35% or more and 1.2% or less of Mn, and
   0.4% or more and 1.5% or less of Si,
   wherein a remainder has a hyper-eutectoid composition including Fe and inevitable impurities, the cast steel shot media has a mixed structure with pro-eutectoid cementite having a fine pearlite structure as a main constituent, the cast steel shot media is formed in a substantially spherical shape having an average particle diameter of 1.0 mm or more and 2.5 mm of less, and an interlayer interval of the fine pearlite structure is 0.05 μm or more and 1.0 μm or less.

2. The cast steel shot media according to claim 1, further comprising 0.05% or less of P and 0.05% or less of S at a weight ratio as the inevitable impurities.

3. The cast steel shot media according to claim 1, wherein a Rockwell hardness of the cast steel shot media is HRC 35 or more and HRC 50 or less.

4. The cast steel shot media according to claim 1, wherein the cast steel shot media is used for grinding of a casting.

5. The cast steel shot media according to claim 1, wherein a passive film is formed on the surface.

6. The cast steel shot media according to claim 5, wherein an average thickness of the passive film is 2 μm or more and 5 μm or less.

7. The cast steel shot media according to claim 1, wherein the weight ratio of C is 0.8% or more and 1.1% or less.

8. The cast steel shot media according to claim 1, wherein the weight ratio of Mn is 0.6% or more and 1.1% or less.

9. The cast steel shot media according to claim 1, wherein the weight ratio of Si is 0.6% or more and 1.0% or less.

10. The cast steel shot media according to claim 1, comprising at a weight ratio Cr of 0.05% or more and 0.8% or less.

11. The cast steel shot media according to claim 1, further comprising 0.005% or more and 0.05% or less of P and 0.005% or more and 0.05% or less of S at a weight ratio as the inevitable impurities.

* * * * *